(12) United States Patent
Braunberger (10) Patent No.: US 9,834,184 B2
(45) Date of Patent: Dec. 5, 2017

(54) TRAILER BRAKING SYSTEM AND CONTROLLER

(71) Applicant: VISION WORKS IP CORPORATION, Sequim, WA (US)

(72) Inventor: Fritz Braunberger, Sequim, WA (US)

(73) Assignee: Vision Works IP Corporation, Sequim, WA (US)

( * ) Notice: Subject to any disclaimer, the term of this patent is extended or adjusted under 35 U.S.C. 154(b) by 92 days.

(21) Appl. No.: 14/026,121

(22) Filed: Sep. 13, 2013

(65) Prior Publication Data

US 2015/0081184 A1    Mar. 19, 2015

(51) Int. Cl.
  *B60T 7/20*   (2006.01)

(52) U.S. Cl.
  CPC ............ *B60T 7/20* (2013.01); *B60T 2230/06* (2013.01); *B60T 2260/09* (2013.01)

(58) Field of Classification Search
  None
  See application file for complete search history.

(56) References Cited

U.S. PATENT DOCUMENTS

| | | | |
|---|---|---|---|
| 3,725,921 A | | 4/1973 | Weidman et al. |
| 3,846,749 A | | 11/1974 | Curry |
| 3,877,299 A | | 4/1975 | Clayton |
| 3,995,911 A | * | 12/1976 | Kasselmann et al. ............ 303/2 |
| 4,195,328 A | | 3/1980 | Harris, Jr. |
| 4,232,910 A | * | 11/1980 | Snyder .......................... 303/123 |
| 4,344,139 A | | 8/1982 | Miller et al. |
| 4,349,233 A | | 9/1982 | Bullard et al. |
| 4,361,871 A | | 11/1982 | Miller et al. |
| 4,402,142 A | | 9/1983 | Dinsmore |

(Continued)

FOREIGN PATENT DOCUMENTS

| | | |
|---|---|---|
| DE | 102005006528 A1 | 8/2004 |
| JP | 1107496 A | 10/1973 |

(Continued)

OTHER PUBLICATIONS

Veovodsky, John, "Evaluation of a Declaration Warning Light for Reducing Rear-End AutomobileCollisions," Journal of Applied Psychology, 1974, vol. 59, No. 3, pp. 270-273.

(Continued)

*Primary Examiner* — Rami Khatib
(74) *Attorney, Agent, or Firm* — Haverstock & Owens LLP (57) ABSTRACT

A trailer brake controller and system detects absolute deceleration of a trailer by incorporating an electronic gyroscope/accelerometer combination in order to accurately calculate the deceleration subtracting out the component which is due to the force of gravity. The controller and system also receives and reads information from the towing vehicle's speed sensor. The system detects the deceleration of the trailer and sends a signal to a trailer brake activation circuit based upon an acceleration status of the trailer. In some embodiments, the system detects that the trailer is decelerating and the trailer control device sends a signal to the trailer braking system activation circuit to activate the trailer brakes. Particularly, the system is able to detect that the trailer is decelerating at an unsafe rate and to activate the trailer brakes and slow the trailer to a safe speed.

22 Claims, 5 Drawing Sheets

(56) References Cited

U.S. PATENT DOCUMENTS

| | | | |
|---|---|---|---|
| 4,515,124 A | 5/1985 | Hayashi | |
| 4,542,460 A | 9/1985 | Weber | |
| 4,779,696 A | 10/1988 | Harada et al. | |
| 4,976,330 A | 12/1990 | Matsumoto | |
| 5,017,904 A | 5/1991 | Browne et al. | |
| 5,039,173 A * | 8/1991 | Emig et al. | 303/7 |
| 5,314,037 A | 5/1994 | Shaw et al. | |
| 5,381,135 A | 1/1995 | Blount | |
| 5,453,662 A | 9/1995 | Gottlieb | |
| 5,473,306 A | 12/1995 | Adell | |
| 5,518,308 A * | 5/1996 | Sugawara | 303/169 |
| 5,589,817 A | 12/1996 | Furness | |
| 5,594,414 A | 1/1997 | Namngani | |
| 5,617,199 A | 4/1997 | Dunne | |
| 5,620,236 A * | 4/1997 | McGrath et al. | 303/7 |
| 5,678,650 A | 10/1997 | Ishihara et al. | |
| 5,770,999 A | 6/1998 | Rhodes | |
| 5,831,162 A | 11/1998 | Sparks et al. | |
| 5,856,620 A | 1/1999 | Okada | |
| 5,874,904 A | 2/1999 | Hirabayashi | |
| 6,020,814 A | 2/2000 | Robert | |
| 6,023,221 A | 2/2000 | Michelotti | |
| 6,073,070 A | 6/2000 | Diekhans | |
| 6,085,133 A | 7/2000 | Keuper et al. | |
| 6,097,156 A | 8/2000 | Diep | |
| 6,176,555 B1 * | 1/2001 | Semsey | 303/7 |
| 6,233,515 B1 | 5/2001 | Engelman et al. | |
| 6,273,522 B1 * | 8/2001 | Feetenby et al. | 303/7 |
| 6,298,931 B1 | 10/2001 | Easton | |
| 6,351,211 B1 | 2/2002 | Bussard | |
| 6,411,204 B1 | 6/2002 | Bloomfield et al. | |
| 6,417,764 B2 | 7/2002 | Tonkin | |
| 6,417,767 B1 * | 7/2002 | Carlson | B60Q 1/445 340/438 |
| 6,459,369 B1 | 10/2002 | Wang | |
| 6,525,652 B2 | 2/2003 | Smith | |
| 6,553,284 B2 * | 4/2003 | Holst et al. | 701/1 |
| 6,556,908 B1 | 4/2003 | Lu et al. | |
| 6,600,414 B2 | 7/2003 | Foo et al. | |
| 6,647,328 B2 | 11/2003 | Walker | |
| 6,668,225 B2 * | 12/2003 | Oh et al. | 701/70 |
| 6,710,709 B1 | 3/2004 | Morin et al. | |
| 6,753,769 B1 | 6/2004 | Elliot | |
| 6,765,495 B1 | 7/2004 | Dunning et al. | |
| 6,802,573 B2 | 10/2004 | Eberling | |
| 6,850,156 B2 | 2/2005 | Bloomfield et al. | |
| 6,856,883 B2 | 2/2005 | Traylor | |
| 6,870,474 B1 | 3/2005 | Brothers | |
| 7,077,549 B1 | 7/2006 | Corliss | |
| 7,104,364 B2 | 9/2006 | Godlewsky et al. | |
| 7,216,026 B2 * | 5/2007 | Heuer | 701/70 |
| 7,239,953 B2 | 7/2007 | Braunberger | |
| 7,259,357 B2 | 8/2007 | Walker | |
| 7,412,329 B2 | 8/2008 | Urai et al. | |
| 7,418,345 B2 | 8/2008 | Diebold et al. | |
| 7,425,903 B2 | 9/2008 | Boss et al. | |
| 7,427,929 B2 | 9/2008 | Bauer et al. | |
| 7,529,609 B2 | 5/2009 | Braunberger et al. | |
| 7,548,173 B2 | 6/2009 | Tengler et al. | |
| 7,554,435 B2 | 6/2009 | Tengler et al. | |
| 7,782,227 B2 | 8/2010 | Boss et al. | |
| 7,798,263 B2 * | 9/2010 | Tandy et al. | 180/14.6 |
| 8,000,871 B2 | 8/2011 | Braunberger et al. | |
| 8,155,847 B2 | 4/2012 | Wang | |
| 8,315,769 B2 | 11/2012 | Braunberger et al. | |
| 8,428,839 B2 | 4/2013 | Braunberger et al. | |
| 8,437,935 B2 | 5/2013 | Braunberger et al. | |
| 8,508,441 B2 | 8/2013 | Kimura | |
| 8,532,896 B2 * | 9/2013 | Braunberger | B60Q 1/447 701/1 |
| 8,571,776 B2 | 10/2013 | Braunberger et al. | |
| 8,700,285 B2 * | 4/2014 | Barlsen | B60Q 1/305 340/431 |
| 8,930,114 B1 * | 1/2015 | Reid | 701/83 |
| 8,941,482 B1 | 1/2015 | Gouverneur | |
| 2001/0056544 A1 | 12/2001 | Walker | |
| 2002/0133282 A1 | 9/2002 | Ryan et al. | |
| 2002/0154514 A1 | 10/2002 | Yagi | |
| 2002/0171542 A1 | 11/2002 | Bloomfield et al. | |
| 2003/0006886 A1 | 1/2003 | Gabbard | |
| 2003/0039123 A1 | 2/2003 | Crisick | |
| 2003/0133306 A1 | 7/2003 | Kakizoe et al. | |
| 2003/0138131 A1 | 7/2003 | Stam | |
| 2003/0151502 A1 | 8/2003 | Kam | |
| 2003/0201885 A1 | 10/2003 | Currie | |
| 2004/0049324 A1 | 3/2004 | Walker | |
| 2004/0077459 A1 | 4/2004 | Hase | |
| 2004/0090314 A1 | 5/2004 | Iwamoto | |
| 2004/0105264 A1 | 6/2004 | Spero | |
| 2004/0119334 A1 * | 6/2004 | Lenz et al. | 303/146 |
| 2004/0139034 A1 | 7/2004 | Farmer | |
| 2004/0140143 A1 | 7/2004 | Saeki et al. | |
| 2004/0160315 A1 | 8/2004 | Speckhart et al. | |
| 2004/0167702 A1 | 8/2004 | Isogai et al. | |
| 2004/0215393 A1 | 10/2004 | Matsumoto | |
| 2004/0222918 A1 | 11/2004 | Kakishita et al. | |
| 2005/0004760 A1 | 1/2005 | Urai et al. | |
| 2005/0135081 A1 | 6/2005 | Ishiguro | |
| 2005/0141232 A1 | 6/2005 | Chon | |
| 2005/0156722 A1 | 7/2005 | McCall | |
| 2005/0156727 A1 | 7/2005 | Golder | |
| 2005/0162106 A1 | 7/2005 | Cho | |
| 2005/0200467 A1 | 9/2005 | Au | |
| 2005/0207619 A1 | 9/2005 | Lohmann | |
| 2005/0223762 A1 | 10/2005 | Yamamoto | |
| 2005/0232469 A1 | 10/2005 | Schofield | |
| 2005/0248446 A1 | 11/2005 | Watabe et al. | |
| 2006/0025897 A1 | 2/2006 | Shostak et al. | |
| 2006/0026017 A1 | 2/2006 | Walker | |
| 2006/0072914 A1 | 4/2006 | Arai et al. | |
| 2006/0074540 A1 | 4/2006 | Braunberger et al. | |
| 2006/0076827 A1 * | 4/2006 | Albright et al. | 303/123 |
| 2006/0206246 A1 | 9/2006 | Walker | |
| 2007/0052530 A1 | 3/2007 | Diebold et al. | |
| 2007/0063824 A1 | 3/2007 | Gaddy | |
| 2007/0135979 A1 | 6/2007 | Plante | |
| 2007/0135980 A1 | 6/2007 | Plante | |
| 2007/0136078 A1 | 6/2007 | Plante | |
| 2007/0188348 A1 | 8/2007 | Bauer et al. | |
| 2007/0205882 A1 | 9/2007 | Ehrlich et al. | |
| 2007/0219685 A1 | 9/2007 | Plante | |
| 2007/0233337 A1 | 10/2007 | Plishner | |
| 2007/0252723 A1 | 11/2007 | Boss et al. | |
| 2007/0260385 A1 * | 11/2007 | Tandy et al. | 701/70 |
| 2008/0067862 A1 * | 3/2008 | Parrott et al. | 303/7 |
| 2008/0082261 A1 | 4/2008 | Tengler et al. | |
| 2008/0091309 A1 | 4/2008 | Walker | |
| 2008/0111666 A1 | 5/2008 | Plante et al. | |
| 2008/0120175 A1 | 5/2008 | Doering | |
| 2008/0122603 A1 | 5/2008 | Plante et al. | |
| 2008/0122605 A1 | 5/2008 | Tengler et al. | |
| 2008/0122652 A1 | 5/2008 | Tengler | |
| 2008/0147266 A1 | 6/2008 | Plante et al. | |
| 2008/0147267 A1 | 6/2008 | Plante et al. | |
| 2008/0183344 A1 | 7/2008 | Doyen et al. | |
| 2008/0183825 A1 | 7/2008 | Alicherry et al. | |
| 2008/0288192 A1 | 11/2008 | Kumar et al. | |
| 2008/0316053 A1 | 12/2008 | Boss et al. | |
| 2009/0040073 A1 | 2/2009 | Bootes | |
| 2009/0118960 A1 * | 5/2009 | Harrison | 701/71 |
| 2009/0125170 A1 | 5/2009 | Noffsinger et al. | |
| 2009/0140887 A1 | 6/2009 | Breed | |
| 2009/0147966 A1 | 6/2009 | McIntosh et al. | |
| 2009/0157255 A1 | 6/2009 | Plante | |
| 2009/0189756 A1 | 7/2009 | Wu | |
| 2009/0242284 A1 | 10/2009 | Whestone, Jr. | |
| 2009/0242285 A1 | 10/2009 | Whestone, Jr. | |
| 2009/0261963 A1 | 10/2009 | Ault | |
| 2010/0042349 A1 * | 2/2010 | Eriksson | G01C 21/16 702/94 |
| 2010/0063736 A1 | 3/2010 | Hoetzer | |
| 2010/0152989 A1 * | 6/2010 | Smith et al. | 701/78 |
| 2010/0217507 A1 | 8/2010 | Braunberger et al. | |
| 2010/0318258 A1 | 12/2010 | Katayama et al. | |

(56) References Cited

U.S. PATENT DOCUMENTS

| | | |
|---|---|---|
| 2010/0332074 A1 | 12/2010 | Brigshella et al. |
| 2010/0332101 A1 | 12/2010 | Braunberger et al. |
| 2011/0050102 A1 | 3/2011 | Le Bars et al. |
| 2011/0145042 A1 | 6/2011 | Green et al. |
| 2011/0199199 A1 | 8/2011 | Perkins |
| 2011/0210666 A1 | 9/2011 | Shiao |
| 2012/0041659 A1* | 2/2012 | Greene ............ 701/70 |
| 2012/0155098 A1 | 6/2012 | Kasaba |
| 2013/0133306 A1 | 5/2013 | Qiu |
| 2013/0184979 A1 | 7/2013 | Karandikar |
| 2014/0046566 A1* | 2/2014 | Maitlen ............ 701/70 |
| 2014/0118132 A1 | 5/2014 | Braunberger et al. |
| 2014/0343813 A1* | 11/2014 | Morselli ........ B60T 8/1708 701/70 |
| 2014/0361687 A1 | 12/2014 | Olson et al. |
| 2015/0061492 A1 | 3/2015 | Braunberger |
| 2015/0062935 A1 | 3/2015 | Braunberger |
| 2015/0062936 A1 | 3/2015 | Braunberger |

FOREIGN PATENT DOCUMENTS

| | | |
|---|---|---|
| JP | 1030854 A | 2/1989 |
| JP | 1111550 A | 4/1989 |
| JP | 7137577 A | 5/1989 |
| JP | 1145247 A | 6/1989 |
| JP | 01173660 A | 7/1989 |
| JP | 06262978 A | 9/1994 |
| JP | 07205717 A | 8/1995 |
| JP | 08310296 A | 11/1996 |
| JP | 9039655 A | 2/1997 |
| JP | 2001030826 A | 2/2001 |
| JP | 2001206145 A | 7/2001 |
| JP | 2001213232 A | 8/2001 |
| JP | 2002240624 A | 8/2002 |
| JP | 2003200782 A | 7/2003 |
| JP | 2005096723 A | 4/2005 |
| JP | 2005145333 A | 6/2005 |
| JP | 2006182172 A | 7/2006 |

OTHER PUBLICATIONS

Moore et al., Historical Development and Current Effectiveness of Rear Lighting Systems, Univ. of Mich. 1999, pp. 1-80.

European Search Report from EP Application No. 07839779.1.

* cited by examiner

TRAILER BRAKING SYSTEM AND CONTROLLER

FIELD OF THE INVENTION

This invention generally relates to trailers and trailer accessories. More specifically, this invention relates to trailer braking systems and controllers.

BACKGROUND OF THE INVENTION

Vehicle trailers of a minimum weight are usually equipped with braking systems independent of the towing vehicle. Non-commercial trailers used for horses, boats, RV's and campers usually incorporate electronic braking systems which are designed to be controlled by the towing vehicle. The braking systems are typically electronic in nature as opposed to pneumatic like semi-tractor brakes. The trailer brakes are important for larger loads because they ensure that the trailer stays in place and does not pass the towing vehicle during severe braking These braking systems are usually standardized and designed to accept control signals from an electronic brake controller mounted in within the towing vehicle. Two types of brake controllers typically exist. Those which are considered proportional and those that are not. Proportional electronic brake controllers are often considered safer and cause the trailer brakes to be applied at an intensity which is in proportion to the deceleration of the towing vehicle. As the deceleration of the towing vehicle increases the braking of the electronic trailer brakes also increases. The signal sent to the trailer brakes is able to be analog (0V to 12V for example) or pulse-width-modulated in nature.

One problem with the existing proportional trailer brake controllers is in the way that the controllers determine deceleration. Deceleration is measured using a pendulum or an electronic accelerometer. Consequently, the controllers must be installed properly on level ground and then adjusted to account for non-level mounting surfaces before they are able to operate effectively. In addition, the controllers often require tuning or a changing of the mounting angle before pulling a trailer. In both cases, acceleration due to the force of gravity is not filtered out and contributes to errors whenever the towing vehicle and trailer are traveling on a sloped roadway.

SUMMARY OF THE INVENTION

In this application "acceleration" refers to either or both positive acceleration and negative acceleration (sometimes called "deceleration"), while "deceleration" refers to only negative acceleration.

The present invention relates to devices and systems that integrate signals from separate sensors to detect an actual acceleration, including deceleration, of a trailer. The controller and system uses signals from an accelerometer, which sometimes detects gravitational acceleration in addition to actual vehicle acceleration, and a gyroscope configured to sense deviations from the plane perpendicular to the earth's gravity. By modifying the signals from the accelerometer based on those from the gyroscope, absolute acceleration, including absolute deceleration of the trailer relative to the road is detected. In some embodiments, an integrated accelerometer and an integrated gyroscope, such as a rate gyroscope, integrates their signals to provide for highly accurate detection of absolute acceleration with no arbitrary thresholds required.

In one aspect, a trailer brake controller located within a trailer comprises an accelerometer-gyroscopic sensor for detecting an absolute acceleration of the trailer, a trailer control device, and a trailer braking system activation circuit, wherein the accelerometer-gyroscopic sensor sends a signal to the trailer control device based upon the absolute acceleration of the trailer and the trailer control device operates the trailer brake activation circuit based upon the signal received from the accelerometer-gyroscopic sensor. In some embodiments, the accelerometer-gyroscopic sensor sends a signal to the trailer control device that the trailer is decelerating and the control device sends a signal to the trailer braking system activation circuit to activate the trailer braking system. In some embodiments, the accelerometer-gyroscopic sensor sends a signal to the trailer control device that the trailer is decelerating at an unsafe rate and the control sends a signal to the trailer braking system activation circuit to activate the trailer braking system. In some of these embodiments, the unsafe rate is dependent upon the weight of the trailer. In some embodiments, the trailer brake controller acts independently from the braking system of the towing vehicle. In further embodiments, the trailer brake controller receives a signal from the towing vehicle corresponding to a deceleration status of the towing vehicle. In some of these embodiments, the trailer brake controller activates the trailer brake if the towing vehicle is decelerating at an unsafe rate. In some embodiments, the unsafe rate is dependent upon the weight of the towing vehicle and the weight of the trailer. In further embodiments, the trailer brake controller is installed as aftermarket equipment.

In another aspect, a trailer braking system comprises a towing vehicle speed sensor, a trailer control device, and a trailer braking system activation circuit, wherein the trailer system control device receives a signal from the towing vehicle speed sensor and sends a signal to the trailer braking system activation circuit based upon the signal from the towing vehicle speed sensor. In some embodiment, the towing vehicle speed sensor sends a signal to the trailer brake control device that the towing vehicle is decelerating and the trailer system control device sends a signal to the trailer braking system activation circuit to activate the trailer braking system. In some of these embodiments, the trailer system control device only sends the signal to the trailer braking system activation circuit when the vehicle slows below a threshold speed. In some embodiments, the towing vehicle speed sensor is located within the towing vehicle. In some of these embodiments, the vehicle speed sensor is installed on the towing vehicle at the factory. In some embodiments, the trailer system control device receives a wired signal from the towing vehicle speed sensor. In further embodiments, the trailer system control device receives a wireless signal from the towing vehicle speed sensor. In some embodiments, the trailer braking system further comprises an accelerometer-gyroscopic sensor for detecting an absolute acceleration of the trailer.

In a further aspect, a method for controlling a trailer that is being pulled by a towing vehicle comprises sensing a deceleration value of the trailer and activating the trailer braking system if the deceleration value is greater than a threshold value. In some embodiments, the method further comprises sensing a weight of the trailer. In some embodiments, the threshold value is dependent upon the weight of the trailer.

In still a further aspect, a method for controlling a trailer that is being pulled by a towing vehicle comprises sensing a slowing of a towing vehicle, sensing a slowing of a trailer and based upon the speed of the towing vehicle and the speed of the trailer activating a trailer braking system. In some embodiments, the trailer braking system is only activated if the trailer and the vehicle are slowing at an unsafe rate. In some embodiments, the method further comprises sensing a weight of the trailer.

DETAILED DESCRIPTION OF THE INVENTION

The present invention includes systems and methods for detecting absolute rates of acceleration of bodies moving relative to a gravitational acceleration. In some embodiments, signals from both an accelerometer, which sometimes detects gravitational acceleration in addition to actual vehicle acceleration, and a gyroscope, which can sense deviations from the plane perpendicular to earth's gravity are used. By modifying the signals from the accelerometer based on those from the gyroscope, an absolute acceleration or deceleration of a vehicle relative to the road, or some other body relative to any object that is fixed relative to some gravity source that affects the body is monitored.

A trailer brake controller and system detects an absolute deceleration of a trailer by incorporating an electronic gyroscope with an accelerometer in order to accurately calculate the acceleration which is due to the force of gravity resulting in absolute deceleration. The controller and system also receives and reads information from the towing vehicle's speed sensor. The system detects the deceleration of the trailer and sends a signal to a trailer brake activation circuit based upon an acceleration status of the trailer. In some embodiments, the system detects that the trailer is decelerating and the trailer control device sends a signal to the trailer braking system activation circuit to activate the trailer brakes. Particularly, the system is able to detect that the trailer is decelerating at an unsafe rate and to activate the trailer brakes and slow the trailer to a safe speed.

Figure 1:
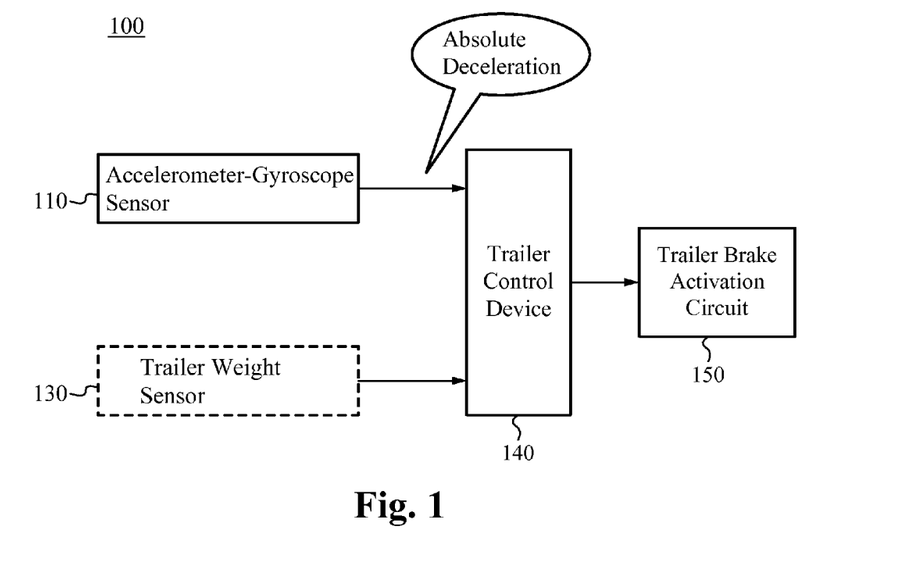
FIG. 1 illustrates a schematic view of a trailer brake controller, in accordance with some embodiments.

Referring now to FIG. 1, a trailer brake controller 100 is depicted therein. The trailer brake controller 100 comprises an accelerometer-gyroscopic sensor 110, a trailer control device 140, and a trailer brake activation circuit 150. The accelerometer-gyroscopic sensor 110 detects an absolute longitudinal deceleration of a trailer as it is pulled by a towing vehicle and sends a signal to the control device 140. The control device 140 processes the signal it receives from the accelerometer-gyroscopic sensor 110 and determines whether to activate the brakes of the trailer. For example, in some embodiments, the accelerometer-gyroscopic sensor 110 detects that the trailer is decelerating and sends a signal to the trailer control device 110. The trailer control device 140 processes the signal it receives from the accelerometer-gyroscopic sensor 110 and sends a signal to the trailer brake activation circuit 150 to activate the trailer brakes and further slow the trailer.

In some embodiments, the accelerometer-gyroscopic sensor 110 sends a signal to the trailer control device 140 that the trailer is decelerating at an unsafe rate and in response the trailer control device 140 sends a signal to the trailer activation circuit 150 to activate the trailer brakes. The unsafe rate of deceleration is able to be a predefined value. For example, in some embodiments, the unsafe rate of deceleration is dependent upon the towing vehicle and/or the towing mechanism and hitch. For example, if the towing vehicle comprises a compact car the unsafe deceleration speed is able to be less than if the towing vehicle is a vehicle more specifically designed for towing a trailer such as a truck. Additionally, the unsafe deceleration speed is able to be defined depending upon whether the trailer is hitched to a bumper of the towing vehicle or a more secure location such as a frame of the towing vehicle. The unsafe deceleration speed is able to be modified so that the trailer does not decelerate at a speed which overwhelms the towing vehicle and/or the tow hitch and create an unsafe condition.

In some embodiments, the unsafe rate of deceleration is dependent upon a weight of the trailer. For example, as shown in FIG. 1, in some embodiments, the trailer brake controller 100 comprises a trailer weight sensor 130. The trailer weight sensor 130 sends a signal to the trailer control device 140 based upon a weight of the trailer. Consequently, the trailer control device 140 is able to process the signal it receives from the accelerometer-gyroscopic sensor 110 and the trailer weight sensor 130 and determine whether to activate the brakes of the trailer. In some embodiments, the unsafe deceleration rate decreases as the weight of the trailer increases. Particularly, the trailer control device 140 sends a signal to the trailer brake activation circuit 150 to activate the trailer brakes when the trailer is decelerating at a lesser rate as the trailer and its contents increase in weight. Consequently, the trailer control device 140 will act sooner in order to slow a heavier trailer so that the weight of the trailer does not overwhelm the towing vehicle and the brakes of the towing vehicle. Additionally, in some embodiments, the trailer weight sensor 130 sends a signal to the trailer control device 140 that the trailer is empty and/or unweighted. In these embodiments, the trailer control device 140 is able to determine to not activate the trailer brakes and the trailer is slowed by the brakes of the towing vehicle.

As described above, the trailer brake controller 100 is able to act independently of the braking system of the towing vehicle in order to slow the trailer. In some embodiments, the trailer brake controller receives a signal from the towing vehicle corresponding to a deceleration and/or a slowing of the towing vehicle. For example, in some embodiments the trailer control device 140 receives a signal that the towing vehicle is slowing and sends a signal to the trailer brake activation circuit 150 to activate the trailer brakes. In some embodiments, the trailer control device 140 only sends a signal to the trailer brake activation circuit 150 to activate the trailer brakes if the towing vehicle is decelerating at an unsafe rate. In some embodiments, the unsafe rate of deceleration is dependent upon the weight of the trailer and the weight of the towing vehicle.

The trailer brake controller 100 is able to be installed as original equipment by the manufacturer at the factory or as an aftermarket add-on. In some embodiments, the trailer brake controller 100 is contained entirely within the trailer.

Figure 2:
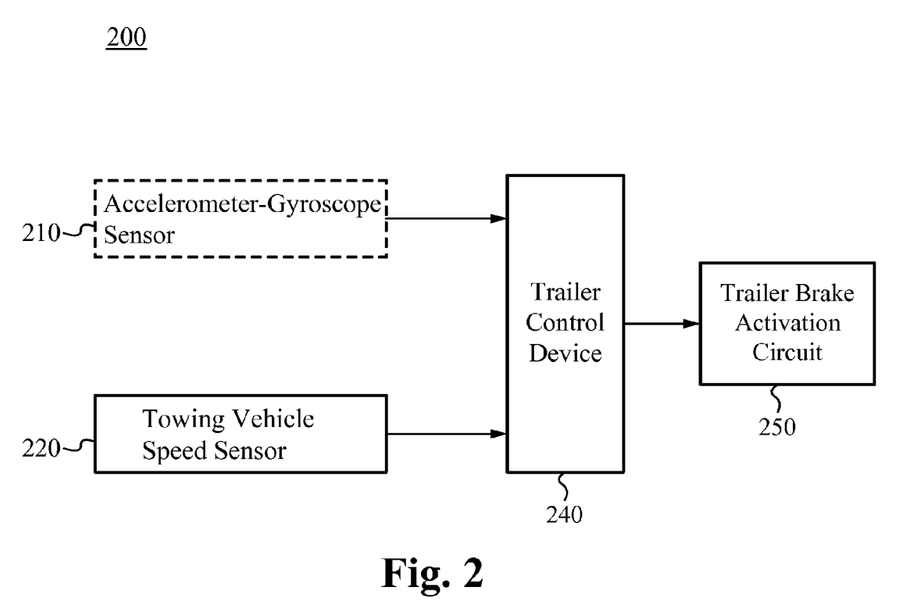
FIG. 2 illustrates a schematic view of a trailer braking system, in accordance with some embodiments.

As described above, in some embodiments, the trailer brake controller receives a signal from the towing vehicle corresponding to a deceleration and/or a slowing of the towing vehicle. FIG. 2 illustrates a trailer braking system 200 in accordance with some embodiments. The trailer braking system 200 is configured to control the brakes of a trailer when the trailer is attached to and being towed by a vehicle. The trailer braking system 200 comprises a towing vehicle speed sensor 220, a trailer control device 240, and a trailer brake activation circuit 250. The towing vehicle speed sensor 220 sends a signal to the trailer control device 240 corresponding to the speed of the towing vehicle. The control device 240 processes the signal from the towing vehicle speed sensor 220 and determines whether to activate the brakes of the trailer. For example, in some embodiments, the towing vehicle speed sensor 220 detects that the towing vehicle is slowing and sends a signal to the trailer control device 240. The trailer control device 240 processes the signal it receives from the towing vehicle speed sensor 220 and sends a signal to the trailer brake activation circuit 250 to activate the trailer brakes and slow the trailer. In some embodiments, the trailer control device 240 only sends a signal to the trailer brake activation circuit 250 to activate the trailer brakes if the vehicle slows below a threshold.

In some embodiments, the trailer braking system 200 communicates with a towing vehicle speed sensor 220 which is located within the towing vehicle. The towing vehicle speed sensor 220 is able to be installed as original equipment by the manufacturer at the factory or as an aftermarket add-on. Additionally, in some embodiments, the towing vehicle speed sensor 220 is connected to the trailer control device 240 by a wired connection. Alternatively, in some embodiments, the towing vehicle speed sensor 220 is connected to the trailer control device 240 by a wireless connection.

As shown in FIG. 2, in some embodiments, the trailer braking system 200 comprises an accelerometer-gyroscopic sensor 210 such as described above in relation to FIG. 1.

The accelerometer-gyroscopic sensor 210 detects an absolute longitudinal deceleration of a trailer as it is pulled by a towing vehicle and sends a signal to the control device 240 and the towing vehicle speed sensor 220 sends a signal to the trailer control device 240 corresponding to the speed of the towing vehicle. The control device processes the signals it receives from the accelerometer-gyroscopic sensor 210 and the towing vehicle speed sensor 220 and determines whether to activate the brakes of the trailer. For example, in some embodiments, the accelerometer-gyroscopic sensor 210 detects that the trailer is decelerating and sends a signal to the trailer control device 240 and the towing vehicle speed sensor 220 detects that towing vehicle is slowing and sends a signal to the trailer control device 240. The trailer control device 240 processes the signal it receives from the accelerometer-gyroscopic sensor 210 and the towing vehicle speed sensor 220 and sends a signal to the trailer brake activation circuit 250 to activate the trailer brakes and further slow the trailer.

In some embodiments, the accelerometer-gyroscopic sensor 210 sends a signal to the trailer control device 240 that the trailer is decelerating at an unsafe rate and in response, the trailer control device 240 sends a signal to the trailer brake activation circuit 250 to activate the trailer brakes. In some embodiments, the accelerometer-gyroscopic sensor 210 sends a signal to the trailer control device 240 that the trailer is decelerating at a rate greater than a slowing of the towing vehicle and in response the trailer control device 240 sends a signal to the trailer activation circuit 250 to activate the trailer brakes. Alternatively, in some embodiments, the accelerometer-gyroscopic sensor 210 sends a signal to the trailer control device 240 that the trailer is decelerating at a rate equal to a slowing of the towing vehicle consequently the trailer brakes are not activated. Particularly, in some embodiments, if the trailer is slowing at a safe rate and/or equal with the towing vehicle then the system 200 is able to utilize only the braking system of the towing vehicle in order to slow the trailer. Consequently, the system 200 is able to specifically tailor an appropriate response and effectively slow a trailer.

In some embodiments, the system comprises a trailer weight sensor, such as described above. The trailer weight sensor sends a signal to the trailer control device 240 based upon a weight of the trailer. Consequently, the trailer control device 240 is able to process the signal it receives from the trailer weight sensor and determine whether to activate the brakes of the trailer.

Figure 3:
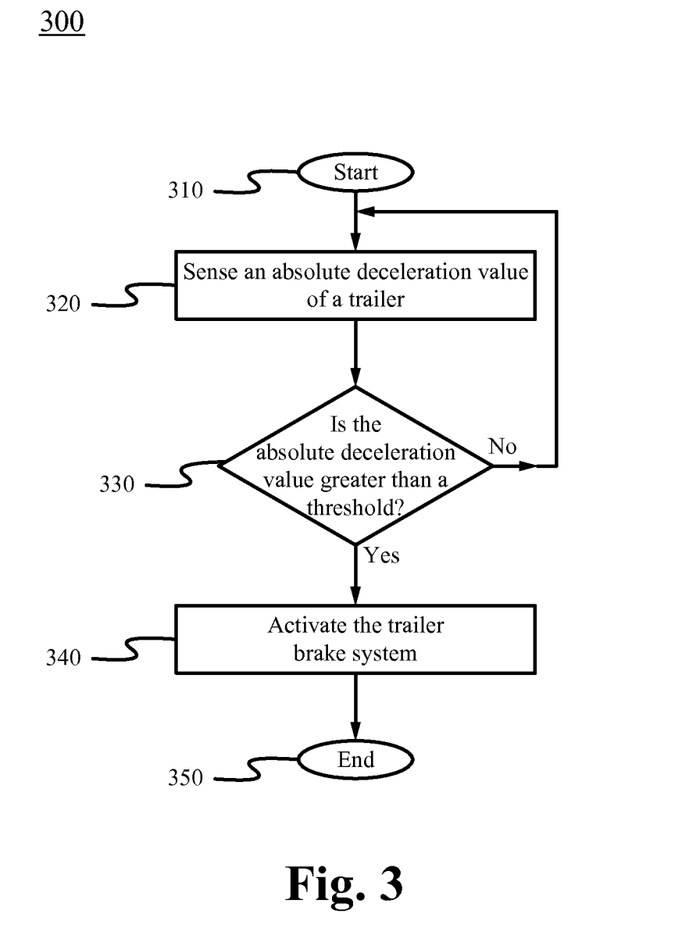
FIG. 3 illustrates a method for controlling a trailer, in accordance with some embodiments.

FIG. 3 illustrates a method for controlling a trailer being pulled by a towing vehicle. The method begins in the step 310. In the step 320, an absolute deceleration value of a trailer is sensed. In some embodiments, the absolute deceleration value of the trailer is sensed using an accelerometer-gyroscopic sensor, such as described above. In the step 330, it is determined if the absolute deceleration value is less than a threshold value. For example, in some embodiments, it is determined if the trailer is decelerating at an unsafe rate. If it is determined that the deceleration value is not greater than the threshold value, the method returns to step 320. If it is determined in the step 330 that the rate of deceleration is greater than a threshold value, then the trailer braking system is activated in the step 340. In some embodiments, the method further comprises sensing a weight of the trailer. In some embodiments, the threshold value is dependent upon the weight of the trailer. The method ends in the step 350.

As described above, the unsafe rate of deceleration is able to be a predefined value. For example, in some embodiments, the unsafe rate of deceleration is dependent upon the towing vehicle and/or the towing mechanism and hitch. For example, if the towing vehicle comprises a compact car, the unsafe deceleration speed is less than if the towing vehicle is a vehicle more specifically designed for towing a trailer, such as a truck. Additionally, the unsafe deceleration speed is able to be defined depending upon whether the trailer is hitched to a bumper of the towing vehicle or a more secure location such as a frame of the towing vehicle. The unsafe deceleration speed is able to be modified so that the trailer does not decelerate at a speed which overwhelms the towing vehicle and/or the tow hitch and create an unsafe condition.

Figure 4:
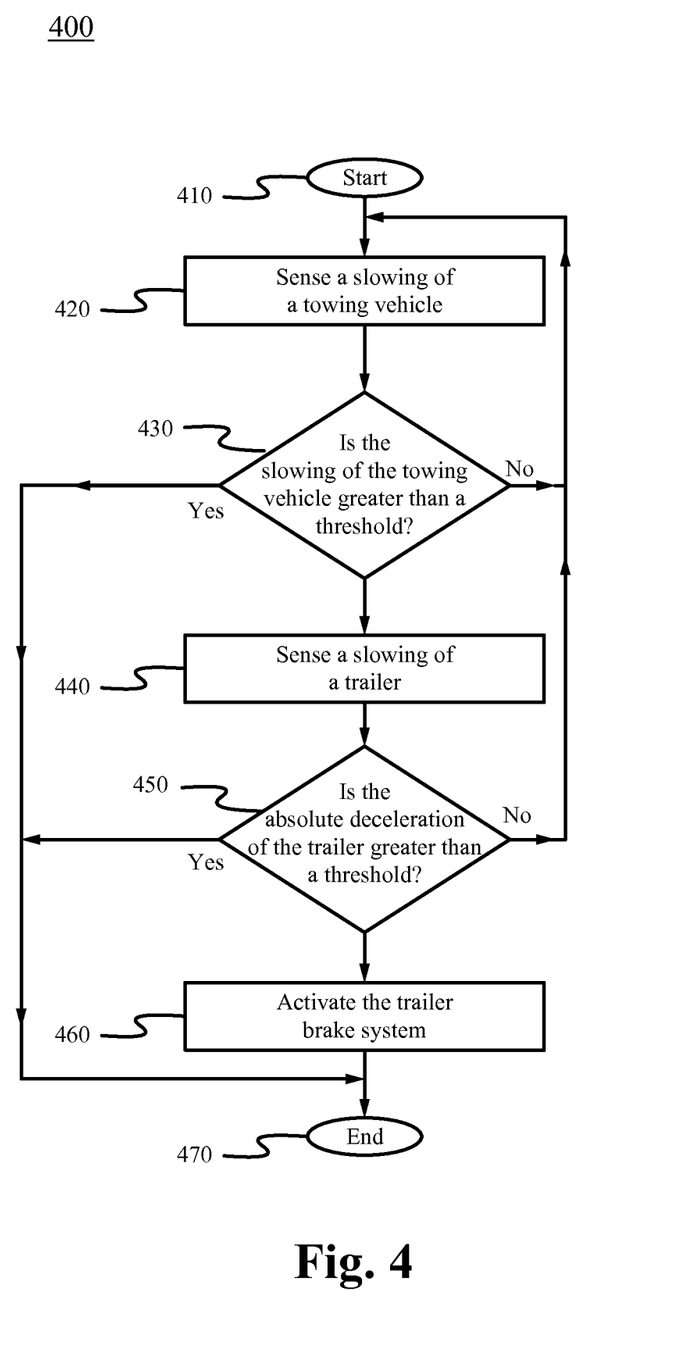
FIG. 4 illustrates a method for controlling a trailer, in accordance with some embodiments.

FIG. 4 illustrates a method of controlling a trailer being pulled by a vehicle. The method begins in the step 410. In the step 420 a slowing of a towing vehicle is sensed. In some embodiments, the slowing of the towing vehicle is detected by a towing vehicle speed sensor and a signal is sent to a trailer control device located within the trailer. If it is determined that the slowing of the towing vehicle is not greater than the threshold value, the method returns to step 420. It is determined in the step 430 if the slowing of the towing vehicle is greater than a threshold value. If it is determined in the step 430 that the rate of deceleration is greater than a threshold value, then the trailer braking system is activated in the step 460. In the step 440, it is determined if the absolute deceleration value of the trailer is greater than a threshold value. For example, in some embodiments, it is determined if the trailer is decelerating at an unsafe rate. If it is determined that the deceleration value is not greater than the threshold value, the method returns to step 420. If it is determined in the step 430 that the rate of deceleration is greater than a threshold value, then the trailer braking system is activated in the step 440. In some embodiments, the trailer brakes are activated only if the slowing vehicle is greater than a threshold value and the absolute deceleration value of the trailer is greater than a threshold value. In some embodiments, the method further comprises sensing a weight of the trailer. In some embodiments, the threshold values are dependent upon the weight of the trailer. The method ends in the step 470.

In one embodiment of this invention, outputs from the sensing of lateral acceleration are used to adjust suspension systems by stiffening outside suspension and/or loosening inside suspension of a moving trailer. When lateral acceleration or force is applied to a trailer, it tends to lean in the direction opposite to the force being applied, due in part to the softness of their suspension systems. This moves the center of gravity further off center and in some cases outside of their wheelbase approaching the critical rollover point. Stiffening the outside suspension and/or loosening the inside suspension keeps the center of gravity the trailer within a tighter envelope relative to the wheelbase. This inversely affects the propensity, especially in high center of gravity loaded trailers, to rollover when the center of gravity of their load exceeds the wheelbase and reaches the critical rollover point. Additionally, by adjusting the suspension system in this manner the distribution of load between left and right side wheels is kept more even resulting in improved traction.

Typically these are configured as pulse width modulated (PWM) controlling devices. Such devices typically accept analog voltage level inputs, which are then converted to a corresponding pulse width output. Such outputs are a common method of controlling and delivering a regulated amount of current to a device such as a hydraulic solenoid. The hydraulic solenoids of course are responsible for increasing, decreasing or maintaining pressure levels within the hydraulic or pneumatic suspension system.

Figure 5:
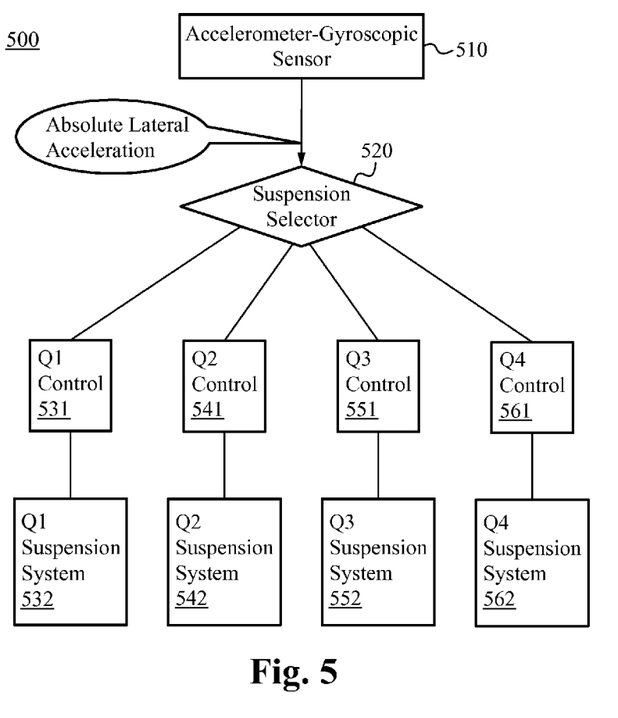
FIG. 5 illustrates a schematic view of an anti-rollover system in accordance with an embodiment of the present invention.

An anti-rollover device 500 using an absolute acceleration signal is illustrated in FIG. 5. In this embodiment a trailer is assumed to be equipped with adjustable suspension systems, typically hydraulic or pneumatic. When absolute lateral acceleration is sensed the accelerometer-gyroscopic sensor 510 sends a signal representing absolute lateral acceleration to a suspension selector 520, which passes signals along to a controller responsible for controlling the relevant quadrant of the suspension. The suspension selector 520 must interpret the signal to determine the appropriate quadrant. For example, Q1, in which suspension system 532 is controlled by suspension control 531 could be the right front wheel; Q2, in which suspension system 542 is controlled by suspension control 541 could be the left front wheel; Q3, in which suspension system 552 is controlled by suspension control 551 could be the right rear wheel; and Q5, in which suspension system 562 is controlled by suspension control 561 could be the left rear wheel. Of course, other orderings are possible, as are systems with only two independent zones, e.g. two sides are controlled in lockstep.

In use, the trailer brake controller and system detects an absolute deceleration of a trailer by incorporating an electronic gyroscope with an accelerometer in order to accurately calculate the acceleration which is due to the force of gravity resulting in absolute deceleration. The controller and system also receives and reads information from the towing vehicle's speed sensor. The system detects the deceleration of the trailer and sends a signal to a trailer brake activation circuit based upon an acceleration status of the trailer. In some embodiments, the system detects that the trailer is decelerating and the trailer control device sends a signal to the trailer braking system activation circuit to activate the trailer brakes. Particularly, the system is able to detect that the trailer is decelerating at an unsafe rate and to activate the trailer brakes and slow the trailer to a safe speed.

Trailer braking systems and controllers that utilize an accelerometer-gyroscopic sensor and/or a towing vehicle speed sensor are easy to install and are able to be incorporated within an existing braking system of a trailer and the towing vehicle. Additionally, because the trailer braking systems and controllers incorporate signals from one or more sensors they are more accurate as to when and how intense the trailer brakes should be activated. Further, because the trailer braking systems and controllers incorporate signals from one or more sensors they do not need to constantly be re-tuned and/or re-referenced. Moreover, the trailer may be equipped with an anti-rollover system in order to further improve safety and performance. Consequently, the trailer braking systems and controllers as described herein are more accurate, safer and have many advantages.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A trailer brake controller configured to be located within a trailer comprising:
   a. an accelerometer-gyroscopic sensor for detecting a gravitational acceleration, an actual vehicle acceleration of the trailer and a deviation of the trailer from a plane perpendicular to earth's gravity and outputting an absolute acceleration;
   b. a trailer control device; and
   c. a trailer braking system activation circuit, wherein the accelerometer-gyroscopic sensor sends a signal to the trailer control device based upon the absolute acceleration of the trailer and the trailer control device activates the trailer brake activation circuit to activate a trailer braking system if the absolute acceleration of the trailer is a rate of deceleration greater than a predefined unsafe value, wherein the trailer braking system is configured to supplement a brake system of a towing vehicle.

2. The trailer brake controller of claim 1 wherein the accelerometer-gyroscopic sensor sends a signal to the trailer control device, the trailer control device analyzes the signal and determines that the trailer is decelerating at an unsafe rate and the control device sends a signal to the trailer braking system activation circuit to activate the trailer braking system.

3. The trailer brake controller of claim 2 wherein the unsafe rate is dependent upon a weight of the trailer.

4. The trailer brake controller of claim 1 wherein the trailer brake controller acts independently from a braking system of a towing vehicle.

5. The trailer brake controller of claim 1 wherein the trailer brake controller receives a signal from a towing vehicle corresponding to a deceleration status of the towing vehicle.

6. The trailer brake controller of claim 5 wherein the trailer brake controller activates the trailer brake if the towing vehicle is decelerating at an unsafe rate.

7. The trailer brake controller of claim 6 wherein the unsafe rate is dependent upon the weight of a towing vehicle and the weight of the trailer.

8. The trailer brake controller of claim 1 wherein the trailer brake controller is installed as aftermarket equipment.

9. A trailer brake controller configured to be located within a trailer comprising:
   a. an accelerometer-gyroscopic sensor for detecting a gravitational acceleration, an actual vehicle acceleration of the trailer and a deviation of the trailer from a plane perpendicular to earth's gravity and outputting an absolute acceleration;
   b. a trailer control device; and
   c. a trailer braking system,
   wherein the accelerometer-gyroscopic sensor sends a signal to the trailer control device based upon the absolute acceleration of the trailer and the trailer control device activates a trailer brake activation circuit to activate the trailer braking system if the absolute acceleration of the trailer is a rate of deceleration greater than a predefined unsafe value, wherein the trailer braking system is configured to supplement a brake system of a towing vehicle.

10. The trailer brake controller of claim 9 wherein the accelerometer-gyroscopic sensor sends a signal to the trailer control device the trailer control device analyzes the signal and determines that the trailer is decelerating at an unsafe rate and the control device sends a signal to activate the trailer braking system.

11. The trailer brake controller of claim 10 wherein the unsafe rate is dependent upon a weight of the trailer.

12. The trailer brake controller of claim 9 wherein the trailer brake controller acts independently from a braking system of a towing vehicle.

13. The trailer brake controller of claim 9 wherein the trailer brake controller receives a signal from a towing vehicle corresponding to a deceleration status of the towing vehicle.

14. The trailer brake controller of claim 13 wherein the trailer brake controller activates the trailer brake if the towing vehicle is decelerating at an unsafe rate.

15. The trailer brake controller of claim 14 wherein the unsafe rate is dependent upon a weight of the towing vehicle and a weight of the trailer.

16. The trailer brake controller of claim 9 wherein the trailer brake controller is installed as aftermarket equipment.

17. A trailer brake controller configured to be located within a trailer comprising:
   a. an accelerometer-gyroscopic sensor for detecting a gravitational acceleration and an actual vehicle acceleration of the trailer and a deviation of the trailer from a plane perpendicular to earth's gravity;
   b. a trailer control device; and
   c. a trailer braking system,
   wherein the accelerometer-gyroscopic sensor sends a signal to the trailer control device based upon the absolute acceleration of the trailer and the trailer control device operates the trailer braking system based upon the signal received from the accelerometer-gyroscopic sensor, wherein the trailer brake controller acts independently from a braking system of a towing vehicle and wherein if the trailer control device analyzes the signal from the accelerometer-gyroscopic sensor and determines that the absolute acceleration of the trailer is a rate of deceleration greater than an unsafe rate, the trailer control device activates the trailer braking system.

18. The trailer brake controller of claim 17 wherein the unsafe rate is dependent upon a weight of the trailer.

19. The trailer brake controller of claim 17 wherein the trailer brake controller activates the trailer brake if the towing vehicle is decelerating at an unsafe rate.

20. The trailer brake controller of claim 19 wherein the unsafe rate is dependent upon a weight of the towing vehicle and a weight of the trailer.

21. The trailer brake controller of claim 17 wherein the trailer brake controller is installed as aftermarket equipment.

22. A trailer brake controller located within a trailer comprising:
   a. an accelerometer to detect gravitational acceleration and actual vehicle acceleration of the trailer;
   b. a gyroscope to sense deviations from a plane perpendicular to earth's gravity, wherein the deviations from the plan perpendicular to earth's gravity are used to modify acceleration signals from the accelerometer to determine absolute acceleration;
   c. a trailer control device; and
   d. a trailer braking system activation circuit,
   wherein a signal is sent to the trailer control device based upon the absolute acceleration of the trailer and the trailer control device activates the trailer brake activation circuit to activate the trailer braking system if the absolute acceleration of the trailer is a rate of deceleration greater than a predefined unsafe value, wherein the trailer braking system supplements a brake system of a towing vehicle.

* * * * *